(12) United States Patent
Priestnall

(10) Patent No.: US 9,597,589 B2
(45) Date of Patent: Mar. 21, 2017

(54) INPUT DEVICE

(71) Applicant: Stephen Priestnall, Birmingham (GB)

(72) Inventor: Stephen Priestnall, Birmingham (GB)

( * ) Notice: Subject to any disclaimer, the term of this patent is extended or adjusted under 35 U.S.C. 154(b) by 75 days.

(21) Appl. No.: 14/421,781

(22) PCT Filed: Aug. 15, 2013

(86) PCT No.: PCT/GB2013/052172
§ 371 (c)(1),
(2) Date: Feb. 13, 2015

(87) PCT Pub. No.: WO2014/027202
PCT Pub. Date: Feb. 20, 2014

(65) Prior Publication Data
US 2015/0209665 A1 Jul. 30, 2015

(30) Foreign Application Priority Data

Aug. 15, 2012 (GB) .................................. 1214560.3
Apr. 15, 2013 (GB) .................................. 1306805.1

(51) Int. Cl.
*A63F 13/218* (2014.01)
*A63F 13/245* (2014.01)
(Continued)

(52) U.S. Cl.
CPC .......... *A63F 13/245* (2014.09); *A63F 13/211* (2014.09); *A63F 13/218* (2014.09);
(Continued)

(58) Field of Classification Search
CPC ...... A63F 2300/1006; A63F 2300/1043; A63F 2300/105; A63F 2300/1062; A63F 13/218
See application file for complete search history.

(56) References Cited

U.S. PATENT DOCUMENTS 5,613,690 A 3/1997 McShane et al.
6,146,343 A * 11/2000 Stewart .................. A61H 15/00
601/118
(Continued)

FOREIGN PATENT DOCUMENTS

JP 2009020656 1/2009
WO 2008009068 1/2008

OTHER PUBLICATIONS

R. Scott, "Wiihabilitation Games: Wii Fit Plus", Wii-Habilitation, 2010, URL: http://wiihabilitationgames.blogspot.de/2010/08/wii-fit-plus.html, Section "Adaptations that can be used with this game in theraphy"; p. 4.

*Primary Examiner* — Jason Skaarup
*Assistant Examiner* — Alex F. R. P. Rada, II
(74) *Attorney, Agent, or Firm* — O'Shea Getz P.C.

(57) ABSTRACT

An input device (1) for data processing apparatus (12) comprises a dish (2) having a convex lower surface (3) which rests on a base (10) and can tilt in a plurality of directions with respect to the base, and a concave upper surface (5) in which is positioned a movable member such as a ball (6) which can move with respect to the concave upper surface. A user is supported on the movable member, in a standing, sitting or kneeling position. The dish is provided with a motion detector module (8) which detects movement of the dish in response to forces applied to the dish as a result of actions performed by the user, and which produces signals in response to such movement. An interface (9) serves to output the signals to the data processing apparatus.

20 Claims, 3 Drawing Sheets

(51) Int. Cl.
*A63F 13/211* (2014.01)
*A63F 13/812* (2014.01)
*G06F 3/01* (2006.01)
*A63F 13/24* (2014.01)

(52) U.S. Cl.
CPC ............ *A63F 13/24* (2014.09); *A63F 13/812* (2014.09); *G06F 3/011* (2013.01); *A63F 2300/105* (2013.01); *A63F 2300/1006* (2013.01); *A63F 2300/1043* (2013.01); *A63F 2300/1062* (2013.01); *A63F 2300/6045* (2013.01); *G06F 2203/012* (2013.01)

(56) References Cited

U.S. PATENT DOCUMENTS

| | | | |
|---|---|---|---|
| 8,277,327 B2 * | 10/2012 | Takeda | A63F 13/02 273/148 B |
| 8,313,378 B1 * | 11/2012 | Snyder | A63F 13/06 463/36 |
| 8,460,104 B1 | 6/2013 | Snyder et al. | |
| 8,517,835 B2 * | 8/2013 | Dwyer | A63F 13/06 273/148 B |
| 8,814,768 B1 * | 8/2014 | Yang | A63B 22/18 482/121 |
| 2007/0155495 A1 | 7/2007 | Goo | |
| 2010/0009762 A1 * | 1/2010 | Takeda | A63B 69/04 273/148 B |

\* cited by examiner

INPUT DEVICE

This application is entitled to the benefit of, and incorporates by reference essential subject matter disclosed in PCT Application No. PCT/GB2013/052172 filed on Aug. 15, 2013, which claims priority to Great Britain Application No. 1214560.3 filed Aug. 15, 2012 and Great Britain Application No. 1306805.1 filed Apr. 15, 2013.

BACKGROUND OF THE INVENTION

1. Technical Field

The present invention relates to an input device for data processing apparatus such as a computer or a games console, having similar functionality to a joystick or similar input device. In particular, the invention is concerned with an input device which require balance and movement by a user.

2. Background Information

It is known to have an input device which requires movement by a user. Such a device is disclosed in United States published patent application 2007/0155495 which describes a simulated surfboard input device. WO2008/009068 discloses a game controller comprising a seat which is mounted in a dish. The user holds a handle and can cause the dish to rock or tilt.

SUMMARY OF THE INVENTION

The present invention relates to an improved input device which requires balance and movement by a user.

According to the invention, there is provided an input device for data processing apparatus comprising a dish having a convex lower surface which can rest on a base and tilt in a plurality of directions with respect to the base, there being positioned a member in the dish on which a user can be supported, the dish being provided with a motion detector module which detects movement of the dish in response to forces applied to the dish as a result of forces applied to the member by the user, and which produces signals in response to such movement; and the dish being provided with an interface to output the signals to the data processing apparatus; characterised in that the dish has a concave upper surface and the member is a movable member which is arranged for movement with respect to the upper surface of the dish in response to forces applied to the movable member by the user.

The upper part of the concave surface may serve as a peripheral wall, to retain the movable member in the dish. Alternatively, the concave upper surface could be provided by, for example a flat or concave surface with a surrounding wall. In any event, the part of the upper surface of the dish in which the movable member is situated and where it may move, is preferably concave.

The movable member may be a ball.

Preferably the movable member is of a size such that a user may stand on the ball. In some embodiments a user may sit or kneel on the ball.

Thus, in one embodiment a user stands, sits or kneels on the ball or other movable member and by transferring weight and/or movement (for example of the feet if the user is standing) applies forces to the movable member and thus to the dish on which the movable member rests. The dish tilts in various directions in response to such forces, and the motion detector module detects such movements and provides signals which the interface feeds to the data processing device.

Movement of the ball or other movable member, can be effected by moving or changing the centre of gravity of the person, movement of limbs such as the arms or feet, movement of the feet and so forth.

Preferably, the motion detector module can detect movement in two or three orthogonal directions so that there are detected tilting movements of the dish forwards, backwards, to the left and to the right. Preferably movements in intermediate directions are also detected, such as forward and left; forward and right; rearward and left and rearward and right. The motion detector module could detect tilting movement in directions through 360 degrees, if for example the module comprises accelerometers arranged in three orthogonal directions. The motion detector module could be mounted in the dish and detect movement, for example by an arrangement of accelerometers and/or one or more gyroscopes. The motion detector module may be mounted centrally in the base of the dish, but it could be mounted at any desired position on or within the dish. The motion detector module could be external of the dish, for example comprising an array of pressure sensors or switches in contact with the exterior of the dish.

In one embodiment the motion detector module comprises an interface for connection to a smart phone or another hand held device such as a games controller, which includes its own motion detection system. The smart phone or other device can be mounted in the dish, for example in a recess so that it is protected, and the outputs from the hand held device fed to the data processing device. A smart phone or similar device may run a software application, or "App", to enable to operate in this manner.

Preferably the ball is of the type known as a "gym ball". Preferably, the ball is resiliently deformable. Preferably the ball is inflatable. The ball may be of rubber or plastics, for example. Preferably the ball is removable form the dish, and preferably the ball is freely supported on the dish with no restraints other than the concave curvature of the dish. An advantage of a separate ball is that it can be replaced, and the diameter and stiffness of the ball can be chosen to match the requirements of the user.

The dish may be of generally circular shape, although it could be elongated in one direction, or it could be of any shape desired. The dish could be made of wood, plastics, metal or any desired material.

The interface module may connect to the data processing device by any desired method such as by means of a wired connection, for example a USB, Firewire™, Thunderbolt™ or other connection, or by means of a wireless connection such as wireless Ethernet or Bluetooth™.

The data processing device may be a computer or a special purpose games console, and the inputs may be used to control a game, movements of an on screen cursor and so forth. Movements may be monitored in the context of an exercise program or a rehabilitation program for a person who has been injured. Both the settings of the program and the nature of the ball can be adjusted to suit the need of the user. The sensitivity of the motion sensor module may also be adjustable.

The invention also extends to a method in which a user supported on the ball performs movements so that the dish moves.

In a modification of the above arrangements, an impact sensing system is also provided. This can detect an impact event which can be used as a trigger, in a manner analogous to clicking a button on a mouse or pressing a button on game controller. There could be a simple system which merely detects whether there has been an impact event. Alternatively, there could be a more sophisticated system which can distinguish between impacts at different positions. For example the acoustic/vibration signature produced by an impact on one side of a ball or other member could be distinguished from that produced by an impact on the other side of the ball or other member. Impacts at any number of positions could be distinguished from each other. Thus any number of controls could be emulated by using impacts. If there are two closely spaced impacts, these could be equivalent to—for example—a double click of a mouse button and the system may thus interpret an number of closely spaced events as a trigger for a particular function.

There will be a number of ways in which an impact signature could be analysed, but one preferred method uses an array of two or more sensors arranged at different locations over the dish, each of which will receive a different signal in response to a given impact. These signals can then be analysed by a module to determine the position of the impact event.

The sensitivity can be chosen to fit the circumstances, but it will be necessary to differentiate an impact signal from the background noise or vibration of movement of the ball or dish. It may be sufficient for a user to tap a foot on the ball to signify an impact event.

An impact could be created by a user creating an impact on the ball or other member, or by the user causing the ball or other member to impact against a portion of the dish, such as a side wall.

BRIEF DESCRIPTION OF THE DRAWINGS

An embodiment of the invention will now be described by way of example and with reference to the accompanying drawings, in which.

DETAILED DESCRIPTION

Figure 1:
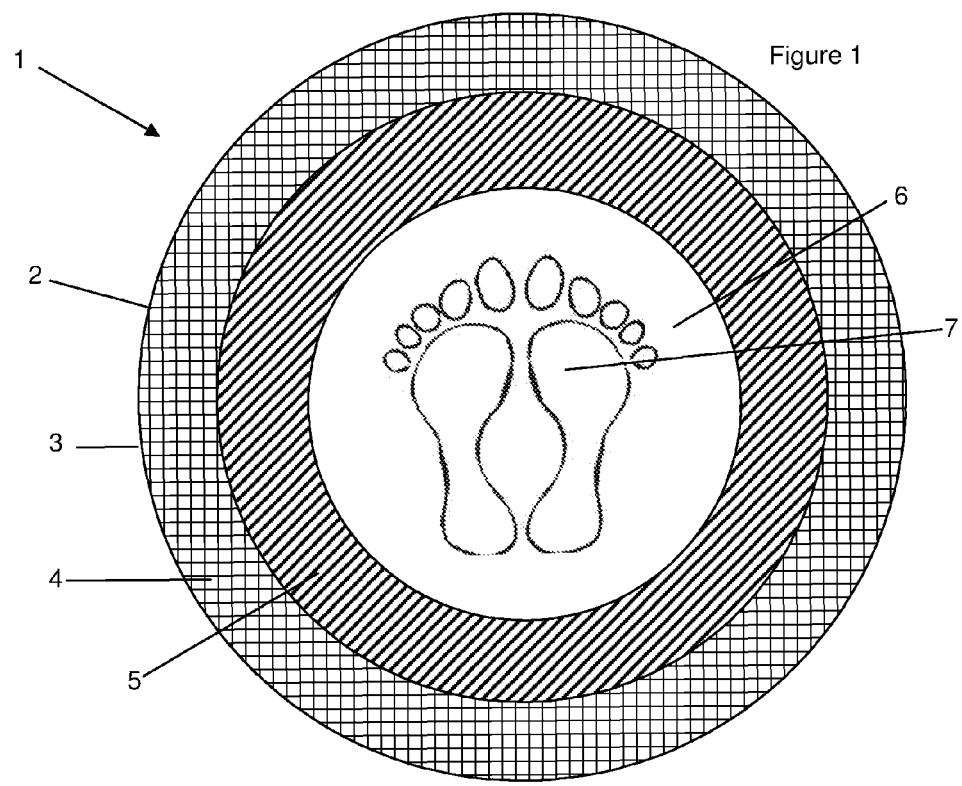
FIG. 1 is a top plan view of a device in accordance with the invention.
Figure 2:
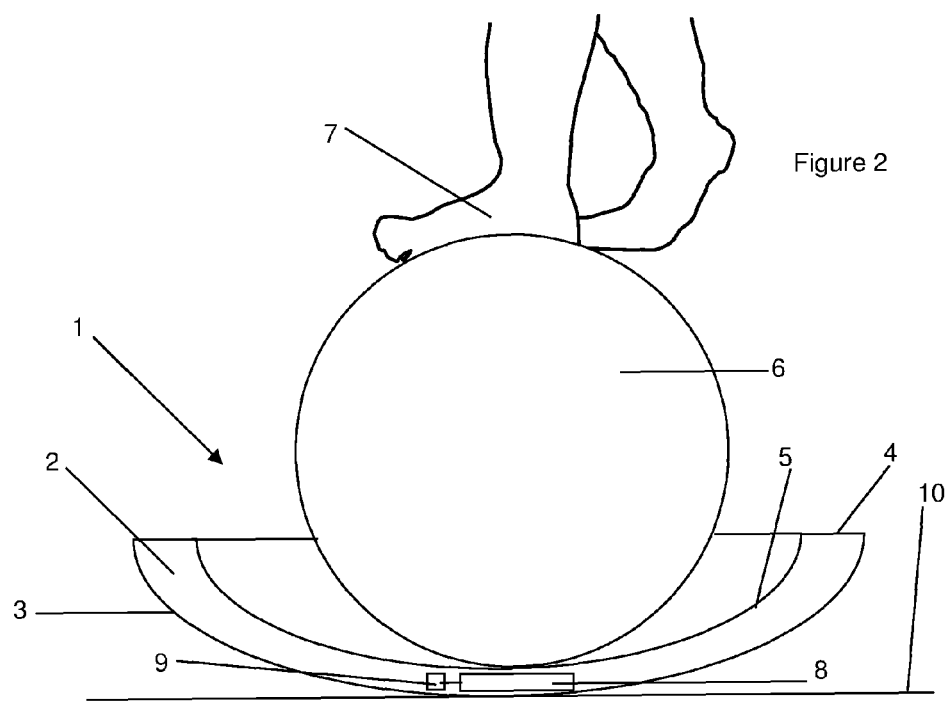
FIG. 2 is a side section on the lines A-A of FIG. 1.
Figure 3:
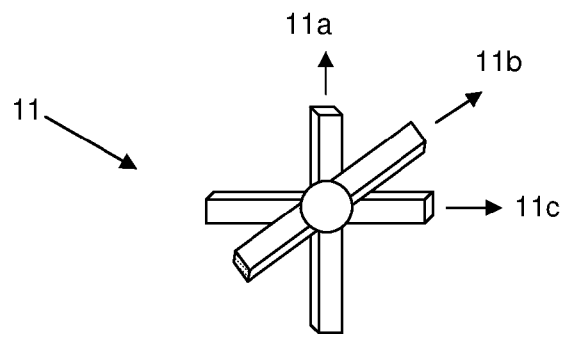
FIG. 3 is a diagrammatic view of part of the motion sensor module.
Figure 4:
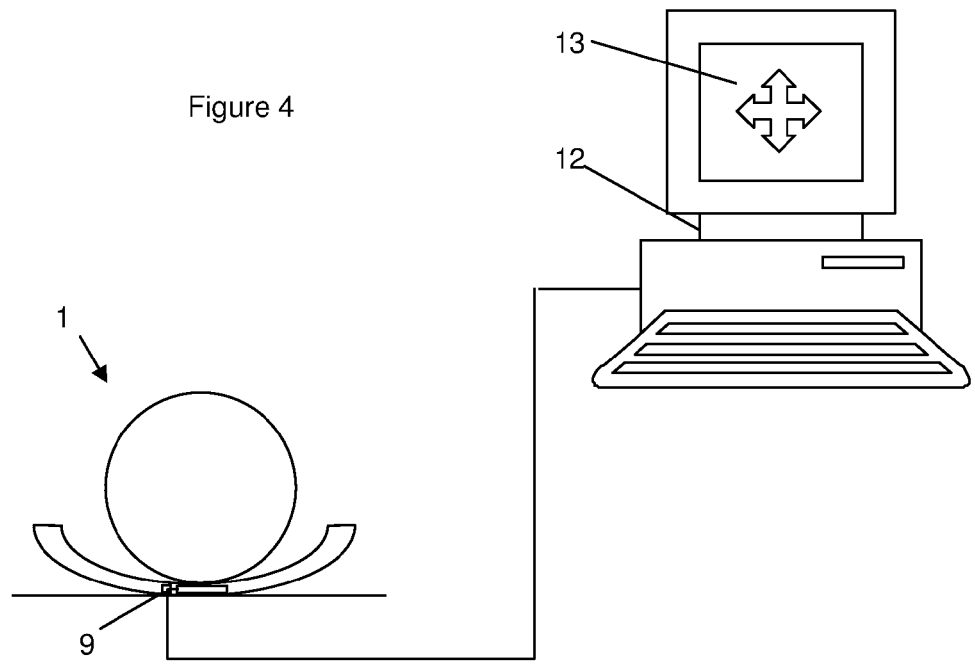
FIG. 4 shows the device connected to a computer.

Referring now to the drawings, the device 1 comprises a circular rounded dish 2 having a curved convex outer surface 3, an upper edge 4, and a curved concave inner surface 5. Within the dish is a gym ball 6 on which are positioned the feet 7 of a user. The dish is provided with a motion detector module 8 within a recess in the base of the dish, which is connected to an interface 9. The dish is supported on a flat base 10. As shown in FIG. 3, the motion detector module 8 includes an accelerometer array 11 comprising three orthogonally arranged accelerometers 11a, 11b and 11c. As shown in FIG. 4, the interface 9 is connected to a computer 12, and may be used, for example, to control the movements of a cursor on a screen 13. The interface bay be connected to the computer by a wired connection or a wireless connection. There may also be a connection to the internet.

By manipulation of the ball with the feet, the movement of the dish 2 can be controlled, and signals sent to the computer so that the device can be used in the same way as a joystick.

Figure 5:
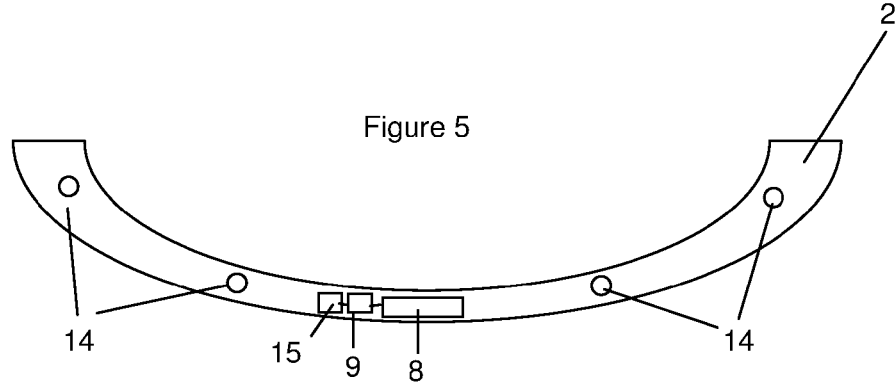
FIG. 5 is a view of a modified device.

In the modification shown in FIG. 5, the dish 2 is also provided with acoustic or vibration sensors 14 which are connected to an impact detecting module 15 that is also connected to the interface 9. When the user impacts against the ball, for example by tapping or stamping on the ball, this will create acoustic or vibration signals that will be picked up by the sensors. The force of the impact will be transmitted through the ball to the dish. An impact could also be created by the user causing the ball to impact physically against a part the dish.

The signals from the sensors will be analysed by the module 15. The position of the impact will affect the "signature" received by the module. Thus stamping or tapping on one side of the ball can be distinguished from stamping or tapping on the other side of the ball, or moving the ball into contact with one side of the dish can be distinguished form moving the ball into contact with the other side of the dish. Thus, whilst for some applications it may be sufficient to detect merely that there has been an impact event, for other application varying the position of the impact can represent different functions. Thus, for example, left or right impacts could represent left or right mouse button activation.

The ball being struck will have a specific acoustic signature and this can be recorded and picked up by the sensors.

The acoustic signature created by the sound waves is converted to electrical impulses which would allow the user to interact further with the application/game. When an action needs to be created the user can strike the ball and the sound wave triggered is picked up by the receptor, is translated in to an electrical impulse and then creates an action within the application. This removes the need for complex buttons and other devices.

Where a mobile phone, for example, is used to provide a motion detecting function, the acoustic receptors/microphone in such a phone can be used as a trigger or button enabler.

A mobile phone or other device which is used to provide a motion detecting function could be adapted to detect an impact, and could also be programmed to recognise the different signatures of impacts at different positions.

As least in the preferred embodiments, the invention provides an input device (1) for data processing apparatus (12) which comprises a dish (2) having a convex lower, outer surface (3) which rests on a base ('10) and can tilt in a plurality of directions with respect to the base, and a concave upper, inner, surface (5) in which is positioned a movable member such as a ball (6) which can move with respect to the concave upper surface. A user is supported on the movable member, in a standing, sitting or kneeling position. The dish is provided with a motion detector module (8) which detects movement of the dish in response to forces applied to the dish as a result of actions performed by the user, and which produces signals in response to such movement. An interface (9) serves to output the signals to the data processing apparatus.

The invention may viewed from a number of aspects. Viewed from another aspect, the invention provides an input device for data processing apparatus comprising a dish having a convex lower surface which can rest on a base and tilt in a plurality of directions with respect to the base, and a concave upper surface in which can be positioned a movable member on which a user can be supported, the dish being provided with a motion detector module which detects movement of the dish in response to forces applied to the dish as a result of forces applied to the movable member by the user, and produces signals in response to such movement, and with an interface to output the signals to the data processing apparatus. Viewed from another aspect the invention provides such a device in combination with a movable member in the dish. The movable member may be a ball.

Viewed from another aspect, the invention provides an input device for data processing apparatus comprises a dish having a convex lower surface which rests on a base and can tilt in a plurality of directions with respect to the base, and a concave upper surface in which is positioned a movable member which is such that it can support a user in a standing, sitting or kneeling position; the movable member is movable with respect to the concave upper surface, in response to actions by a user; the dish is provided with a motion detector module which detects movement of the dish in response to forces applied to the dish as a result of actions performed by the user, and which produces signals in response to such movement; and an interface serves to output the signals to the data processing apparatus.

Viewed from another aspect, the invention provides an input device for data processing apparatus comprising a dish having a convex lower surface which can rest on a base and tilt in a plurality of directions with respect to the base, and a concave upper surface in which can be positioned a movable member on which a user can be supported, the dish being provided with a motion detector module which detects movement of the dish in response to forces applied to the dish as a result of forces applied to the movable member by the user, and produces signals in response to such movement, and with an interface to output the signals to the data processing apparatus.

Viewed from another aspect, the invention provides an input device for data processing apparatus comprising a dish having a convex lower surface which can rest on a base and tilt in a plurality of directions with respect to the base, and a concave upper surface in which is positioned a ball on which a user can be supported, the dish being provided with a motion detector module which detects movement of the dish in response to forces applied to the ball by the user, and produces signals in response to such movement, and with an interface to output the signals to the data processing apparatus.

The invention also extends to the device without a ball so that a gym ball or the like can be chosen by or for a user. Viewed from another aspect, the invention provides an input device for data processing apparatus comprising a dish having a convex lower surface which can rest on a base and tilt in a plurality of directions with respect to the base, and an upper surface in which can be positioned a member on which a user can be supported, the dish being provided with a motion detector module which detects movement of the dish in response to forces applied to the dish, and produces signals in response to such movement, and with an interface to output the signals to the data processing apparatus.

The upper surface may be concave.

The forces applied to the dish can be provided by a ball as described earlier, or by a person standing, sitting or kneeling on any other shape of member such as an inflatable mushroom, or for example by a user standing directly on the dish.

Movement of a user supported on the member in the dish, such as a ball, can be effected by moving or changing the centre of gravity of the person, movement of limbs such as the arms or feet, movement of the feet and so forth. The member itself may not move relative to the dish, although such movement is possible in some embodiments.

Figure 6:
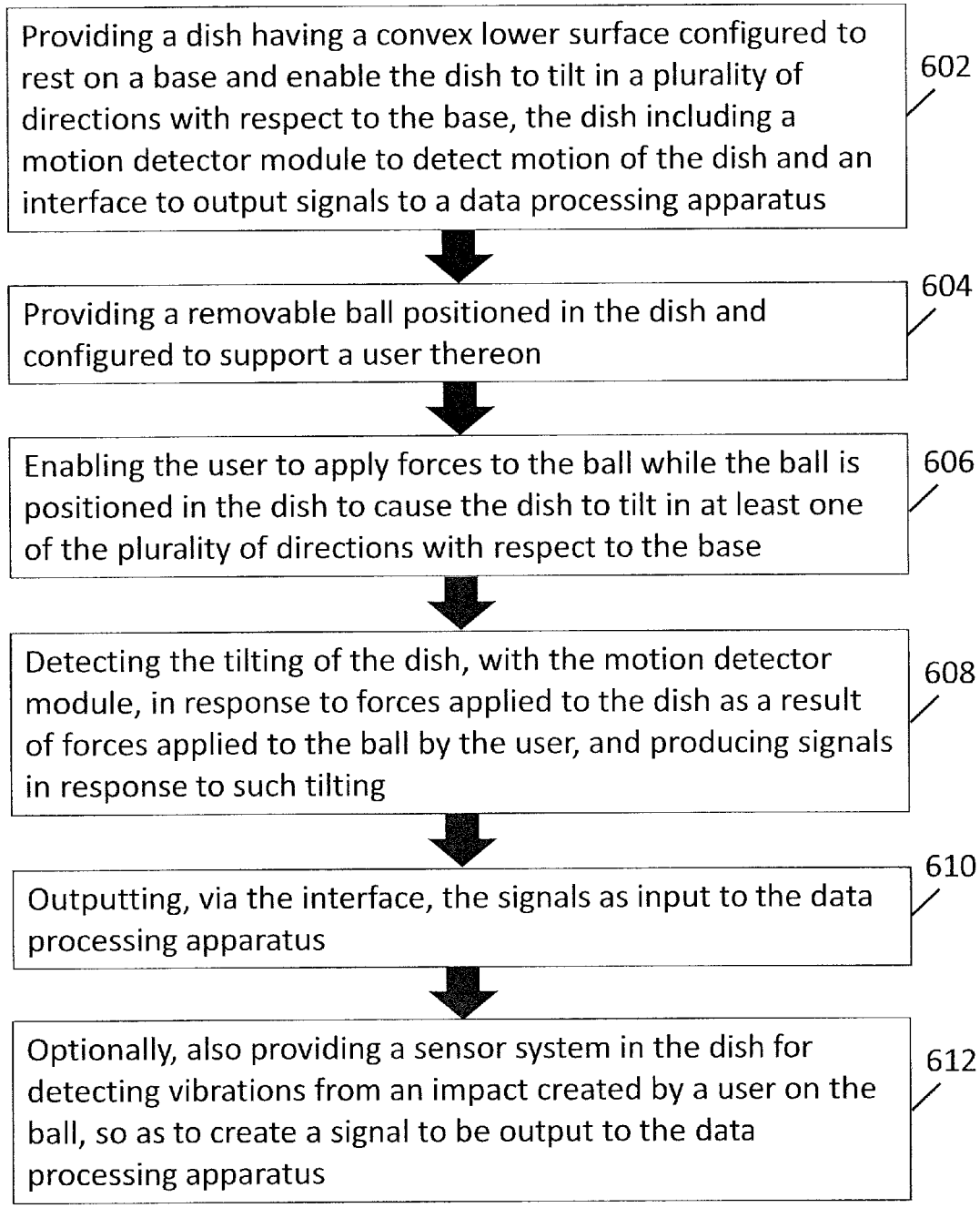
FIG. 6 is a flow chart illustrating a method in accordance with this disclosure.

FIG. 6 illustrates a flow chart of a method. As shown therein, in block 602 a dish is provided having a convex lower surface configured to rest on a base and enable the dish to tilt in a plurality of directions with respect to the base, the dish including a motion detector module to detect motion of the dish and an interface to output signals to a data processing apparatus. In block 604, a removable ball is provided; the removable ball is positioned in the dish and configured to support a user thereon. In block 606, a user is enabled to apply forces to the ball while the ball is positioned in the dish to cause the dish to tilt in at least one of the plurality of directions with respect to the base. In block 608, a tilting of the dish is detected, with the motion detector module, in response to forces applied to the dish as a result of forces applied to the ball by the user; signals are produced in response to such tilting. In block 610, the signals are output via the interface as input to the data processing apparatus. In block 612, (optionally) a sensor system is provided in the dish for detecting vibrations from an impact created by a user on the ball, so as to create a signal to be output to the data processing apparatus.

All of the above further aspects of the invention can be used with the optional features set out in respect of the invention and may be used with the features of the sub-claims set out in the claims.

What is claimed is:

1. An input device for data processing apparatus comprising:
   a dish having a convex lower surface configured to rest on a base and enable the dish to tilt in a plurality of directions with respect to the base; and
   a removable ball positioned in the dish and configured to support a user thereon, wherein the user applies forces to the ball while the ball is positioned in the dish to cause the dish to tilt in at least one of the plurality of directions with respect to the base, the dish further including a motion detector module which detects movement of the dish in response to forces applied to the dish as a result of forces applied to the ball by the user, and which produces signals in response to such movement; and the dish also including an interface to output the signals as input to the data processing apparatus.

2. An input device as claimed in claim 1, wherein the ball is resiliently deformable.

3. An input device as claimed in claim 2, wherein the ball is inflatable.

4. An input device as claimed in claim 1 wherein the motion detector module is configured to detect movement in two or three orthogonal directions so as to detect tilting movements of the dish forwards, backwards, to the left and to the right with respect to the base.

5. An input device as claimed in claim 4, wherein the motion detector module comprises accelerometers arranged in three orthogonal directions.

6. An input device as claimed in claim 1, wherein the motion detector module is mounted in the dish.

7. An input device as claimed in claim 6, wherein the dish has an inner surface for engaging the ball and a cavity defined between the inner surface and the convex lower surface, and wherein the motion detector module is mounted within the cavity of the dish.

8. An input device as claimed in claim 6 wherein the motion detector module is mounted centrally in the base of the dish.

9. An input device as claimed in claim 1, wherein the motion detector module comprises an interface connected to a portable hand held device.

10. An input device as claimed in claim 9, wherein the portable hand held device is a mobile telephone or a games controller.

11. An input device as claimed in claim 9, wherein dish defines a recess therein and the hand held device is mounted in the recess defined in the dish.

12. An input device as claimed in claim 1, wherein the dish is of generally circular shape.

13. An input device as claimed in claim 1, wherein the dish includes a sensor system for detecting vibrations from an impact created by the user supported on the ball, so as create one of the signals to be output to the data processing apparatus.

14. An input device as claimed in claim 13, wherein the sensor system is configured to distinguish between the acoustic or vibration signatures of different impacts created by the user applying forces to the ball at different positions within the dish.

15. An input device as claimed in claim 14, wherein the sensor system includes a plurality of acoustic or vibration sensors.

16. An input device as claimed in claim 1, wherein the dish has a concave upper surface configured to retain the ball inside the dish, and the ball is configured to cause the dish to tilt in at least one of the plurality of directions with respect to the base without moving over the concave upper surface of the dish.

17. A method of providing inputs to data processing apparatus, the method comprising:
 providing a dish having a convex lower surface configured to rest on a base and enable the dish to tilt in a plurality of directions with respect to the base, the dish including a motion detector module to detect motion of the dish and an interface to output signals to the data apparatus;
 providing a removable ball positioned in the dish and configured to support a user thereon;
 enabling the user to apply forces to the ball while the ball is positioned in the dish to cause the dish to tilt in at least one of the plurality of directions with respect to the base,
 detecting the tilting of the dish, with the motion detector module, in response to forces applied to the dish as a result of forces applied to the ball by the user, and producing signals in response to such tilting; and
 outputting, via the interface, the signals as input to the data processing apparatus.

18. A method as claimed in claim 17, further comprising providing a sensor system in the dish for detecting vibrations from an impact created by a user on the ball, so as to create a signal to be output to the data processing apparatus.

19. A method as claimed in claim 17, wherein the dish has a concave upper surface configured to retain the ball inside the dish, and the ball is configured to cause the dish to tilt in at least one of the plurality of directions with respect to the base without moving over the concave upper surface of the dish.

20. An input device for data processing apparatus comprising:
 a dish having a convex lower surface configured to rest on a base and enable the dish to tilt in a plurality of directions with respect to the base, and a concave upper surface configured to retain a removable ball in the dish, the ball being configured to support a user thereon, wherein the user applies forces to the ball while the ball is positioned in the dish to cause the dish to tilt in at least one of the plurality of directions with respect to the base without the ball moving over the concave upper surface of the dish,
 the dish further including a motion detector module which detects movement of the dish in response to forces applied to the dish as a result of forces applied to the ball by the user, and which produces signals in response to such movement; and
 the dish also including an interface to output the signals as input to the data processing apparatus.

* * * * *